(12) United States Patent
Cote et al.

(10) Patent No.: US 7,185,898 B2
(45) Date of Patent: Mar. 6, 2007

(54) LOAD LEVELER FOR A CART

(76) Inventors: Maurice R. Cote, 281 Mason Rd., Milford, NH (US) 03055; James R. Merrill, 26 Melendy Rd., Milford, NH (US) 03055

( * ) Notice: Subject to any disclaimer, the term of this patent is extended or adjusted under 35 U.S.C. 154(b) by 315 days.

(21) Appl. No.: 10/856,250

(22) Filed: May 28, 2004

(65) Prior Publication Data

US 2005/0263969 A1    Dec. 1, 2005

(51) Int. Cl.
*B62B 3/04* (2006.01)
(52) U.S. Cl. ............... 280/33.992; 280/47.35
(58) Field of Classification Search .......... 280/33.991, 280/33.992, 33.996, 47.34, 47.35, 79.11, 280/79.3, 79.7
See application file for complete search history.

(56) References Cited

U.S. PATENT DOCUMENTS

| | | | | | |
|---|---|---|---|---|---|
| 1,639,801 | A | * | 8/1927 | Heise | 296/20 |
| 2,845,729 | A | * | 8/1958 | Baumgart | 40/308 |
| 3,052,484 | A | * | 9/1962 | Huffman et al. | 280/654 |
| 4,765,077 | A | * | 8/1988 | Rosenthal et al. | 40/308 |
| 5,301,443 | A | * | 4/1994 | Gori | 40/308 |
| 5,662,342 | A | * | 9/1997 | Basharat | 280/33.997 |
| 5,794,953 | A | * | 8/1998 | Duchene et al. | 280/33.992 |
| 6,206,385 | B1 | * | 3/2001 | Kern et al. | 280/47.35 |
| 6,523,776 | B1 | * | 2/2003 | Elder | 242/594.4 |
| 6,641,147 | B2 | * | 11/2003 | Werner | 280/33.991 |
| 6,793,223 | B2 | * | 9/2004 | Ondrasik et al. | 280/47.35 |
| 6,860,493 | B2 | * | 3/2005 | Orozco | 280/33.991 |
| 2005/0212234 | A1 | * | 9/2005 | McFarland | |

* cited by examiner

*Primary Examiner*—Christopher Bottorff
(74) *Attorney, Agent, or Firm*—Joseph E. Funk

(57) ABSTRACT

A load leveler is disclosed that is used with a nesting type cart having a basket with a tapered front to provide a level surface for safely carrying loads that are longer than the length of the cart basket and must sit on top of the cart basket in order to be transported. The load leveler comprises spaced vertical pieces on top of the larger rear of the tapered basket to restrain a long load from sliding to the side and off the cart basket, and also comprises a pivoting member that is attached to the top of the front of the tapered basket. The pivoting member provides a raised surface for supporting a long load in a horizontal orientation with the top rear of the basket, and also has vertical members for helping restraining a long load from sliding to the side and off the cart. The pivoting member is lowered and rests against the inside of the front wall of the basket to permit nesting of the carts in a known manner. When a cart does not have a tapered, nesting basket and its top is level, the spaced vertical members on the top rear of the basket are repeated on the top of the front of the basket to help restrain a long load from sliding to the side and off the cart.

4 Claims, 6 Drawing Sheets

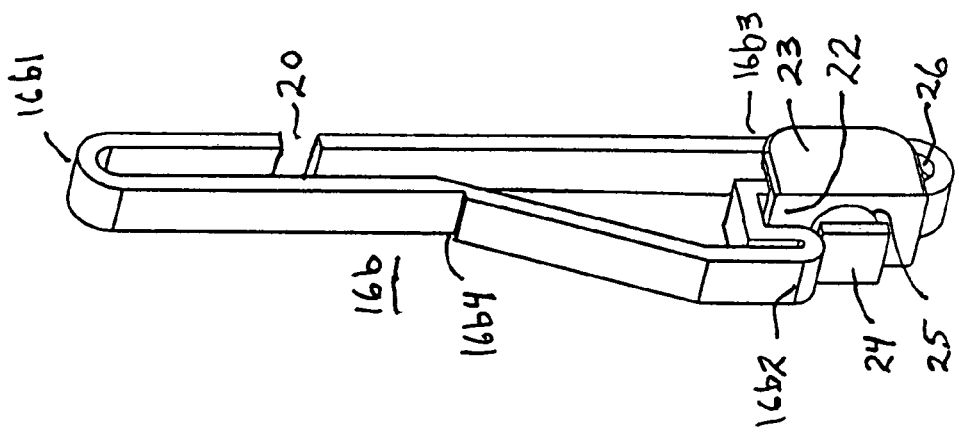
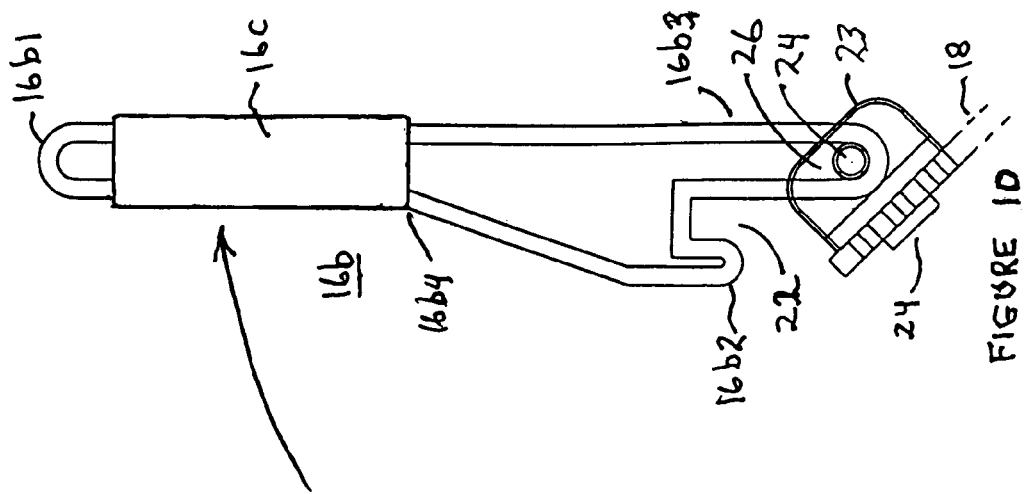

– continued –

LOAD LEVELER FOR A CART

FIELD OF THE INVENTION

The present invention relates to a cart which may be used in a conventional manner, but has means for providing a level surface on top of the cart for safely transporting loads that are longer than the length of the cart and must sit on top of the cart in order to be transported, rather than inside the basket of the cart.

BACKGROUND OF THE INVENTION

Existing carts found in many grocery and other stores need to be stored when not in use and can be nested to conserve space. This is done by the rear wall of the basket of the cart, underneath the push handle of the cart, being hinged nearest the handle and swinging forward and upward so that a front end of another cart may be pushed therein in a nesting fashion to conserve storage space. To permit this nesting operation the basket of the carts must be tapered, with the front of the cart basket being smaller than the rear of the cart basket nearest the handle. Due to the tapered shape of the cart basket the plane in which the top surface of the basket lies is not horizontal to the ground.

In some hardware and building goods stores, such as the Home Depot chain, such nesting carts are utilized. In addition, larger flat bed and other carts designed to carry loads that are larger than the nestable carts normally carry are provided to carry lumber, plywood and other items that cannot fit into the conventional nestable carts. A problem exists in that too often the larger carts are all in use so shoppers try to make do with the conventional nestable carts when they are purchasing one or a few pieces of larger items such as lumber and pipe that are long and cannot fit inside the cart. The shoppers position such longer items on top of the cart. However, with the top of a nestable cart basket not being level the longer items sitting on top of the cart too often fall off or almost fall off and continuously need repositioning. Nevertheless to say, this is a dangerous situation and people get hurt when long loads positioned on top of the cart basket shift and fall due to their weight, or when they are inadvertently bumped and fall off the top of the cart basket. This also happens with non-nestable carts the tops of which are level.

Thus, there is a need in the art for a conventional type cart that can easily and safely carry longer items that cannot fit inside the cart.

SUMMARY OF THE INVENTION

The present invention is a load carrier and leveling means that is used with a conventional cart to provide a level surface for safely carrying loads that are longer than the length of the cart and must sit on top of the cart basket to be transported.

The load carrier and leveling means comprises two spaced vertical members that are fastened to the top of the rear wall of the cart basket just forward of the push handle of the cart, and a third vertical support member that is fastened to the top of the front wall of the cart basket. The vertical support member normally folds down and rests against the inside of the front wall of the basket. When a load longer than can fit inside the cart basket is to be transported, the vertical support member is swung upward and locks in a vertical position. The vertical support member comprises two vertical pieces and a horizontal piece that is elevated above the top of the front wall of the basket and lies in a horizontal plane that includes the top of the rear wall of the basket. Thus, when a long load such as pieces of lumber or pipe, sits on top of the rear wall of the basket and on top of the vertical support member the load lies in a horizontal plane and does not easily fall off.

The vertical support member also includes vertical extensions that protrude above both ends of the horizontal portion. The spaced vertical members on top of the rear wall of the cart basket and the vertical extensions at either end of the horizontal portion of the third member provide horizontal support to small quantities of long pieces of lumber or pipe sitting on top of the basket to help prevent them from falling from the side of the cart and hurting someone.

The novel load carrier and leveling means is used with a nestable, conventional cart that does not have a basket with a horizontal top surface, or a variation of the load carrier and leveling means may be used with a non-nestable cart that has a basket with a horizontal top surface. In the latter embodiment the spaced vertical members on top of the rear wall of the cart basket are also added to the top of the front wall of the cart basket to provide horizontal support to small quantities of long pieces of lumber or pipe sitting on top of the basket.

DESCRIPTION OF THE DRAWING

The invention will be better understood upon reading the following detailed description in conjunction with the drawing in which:

FIG. 5 shows one of two identical vertical pieces of the vertical support member that is mounted on top of the front wall of a shopping cart basket;

FIG. 10 is a side view of one of the two identical vertical pieces of the vertical support member released from its locked upright position and being rotated to its downward, storage position against the inside surface of the front wall of a basket.

DETAILED DESCRIPTION

Figure 1:
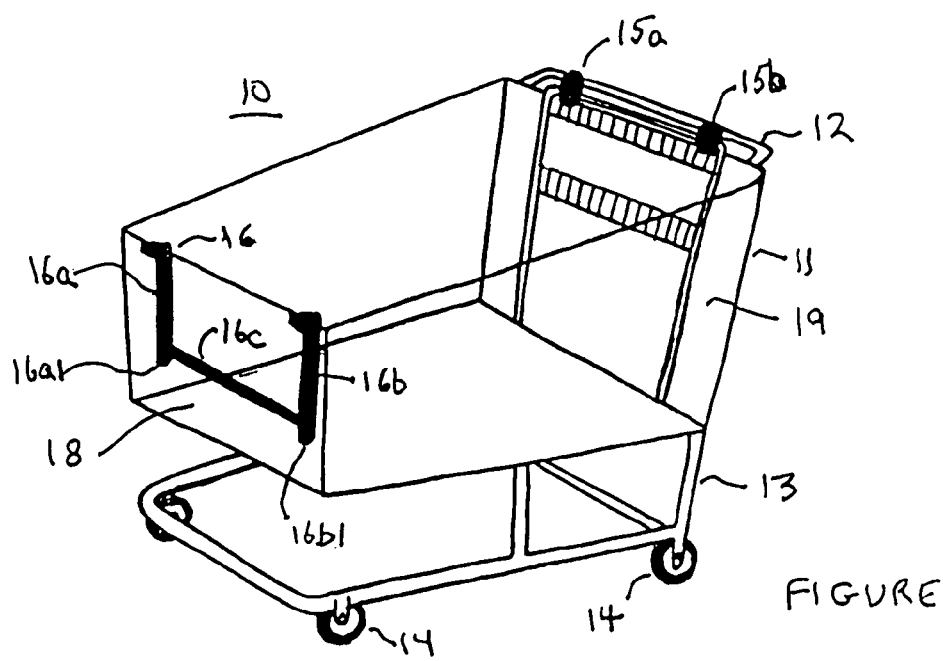
FIG. 1 shows a conventional nesting type cart that does not have a level top and is fitted with the novel load leveler shown in its downward storage position when no long loads are to be carried on top of the cart basket.

The present invention is a load carrier and leveling means that may be used with any conventional cart having nestable or non-nestable baskets, and is utilized for providing a level surface for safely carrying long loads that are longer than the length of the cart and must sit on top of the cart basket to be transported. The novel load carrier and leveling means may be built into the basket of a new cart or it may be retrofitted to an existing cart basket. The novel load leveling means may be used with a conventional nestable cart that does not have a basket with a horizontal top surface; or a variant may be used with a conventional non-nestable cart that has a basket with a horizontal top surface.

When the novel load carrier and leveling means is built into a new cart its elements are either welded to or otherwise more permanently attached to the cart basket or cart frame depending on the material from which the cart basket and frame are made. When the novel load carrier and leveling means is to be retrofitted to an existing cart appropriate sturdy clamps or a twist lock arrangement are utilized. The latter is shown in the drawings and described herein.

It should be understood that there are different types of conventional carts for carrying different levels of loads. A cart utilized in a clothing store may typically have a plastic basket and is designed to carry light loads. In contrast, a cart utilized in a hardware and/or building supply store must be much sturdier to carry heavier loads. The present invention is contemplated to be combined and used with such heavy-duty carts for carrying long loads that do not fit inside the cart basket. Such heavy-duty cart baskets may be made of metal mesh or heavy duty plastic.

Figure 2:
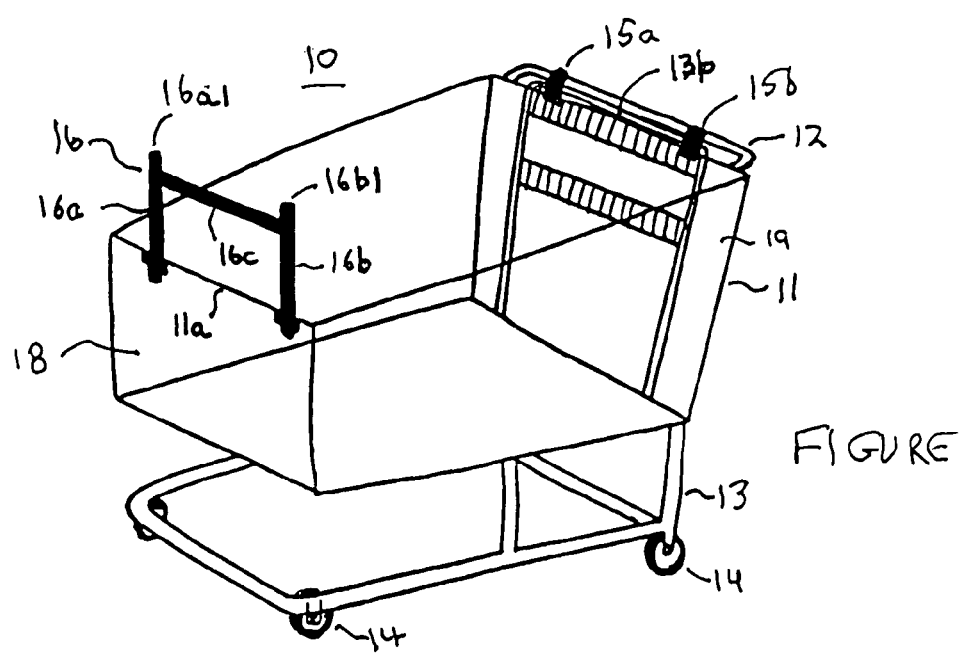
FIG. 2 shows a view of a conventional nesting type cart that does not have a level top with the novel load leveler shown in its upright, locked position for use in supporting long loads to be carried in a level orientation on top of the cart basket.
Figure 3:
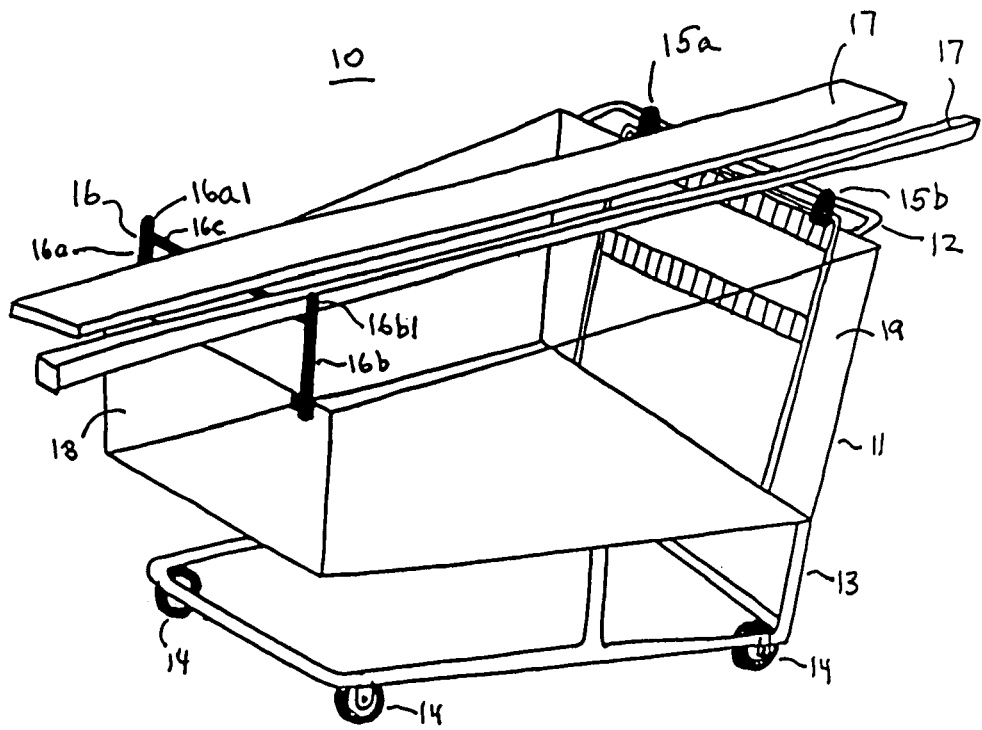
FIG. 3 shows a view of a conventional nesting type cart fitted with the novel vertical support member located in its upright operational position and supporting some long pieces of lumber thereon in a horizontal orientation and constrained from falling off the sides of the cart basket.
Figure 8:
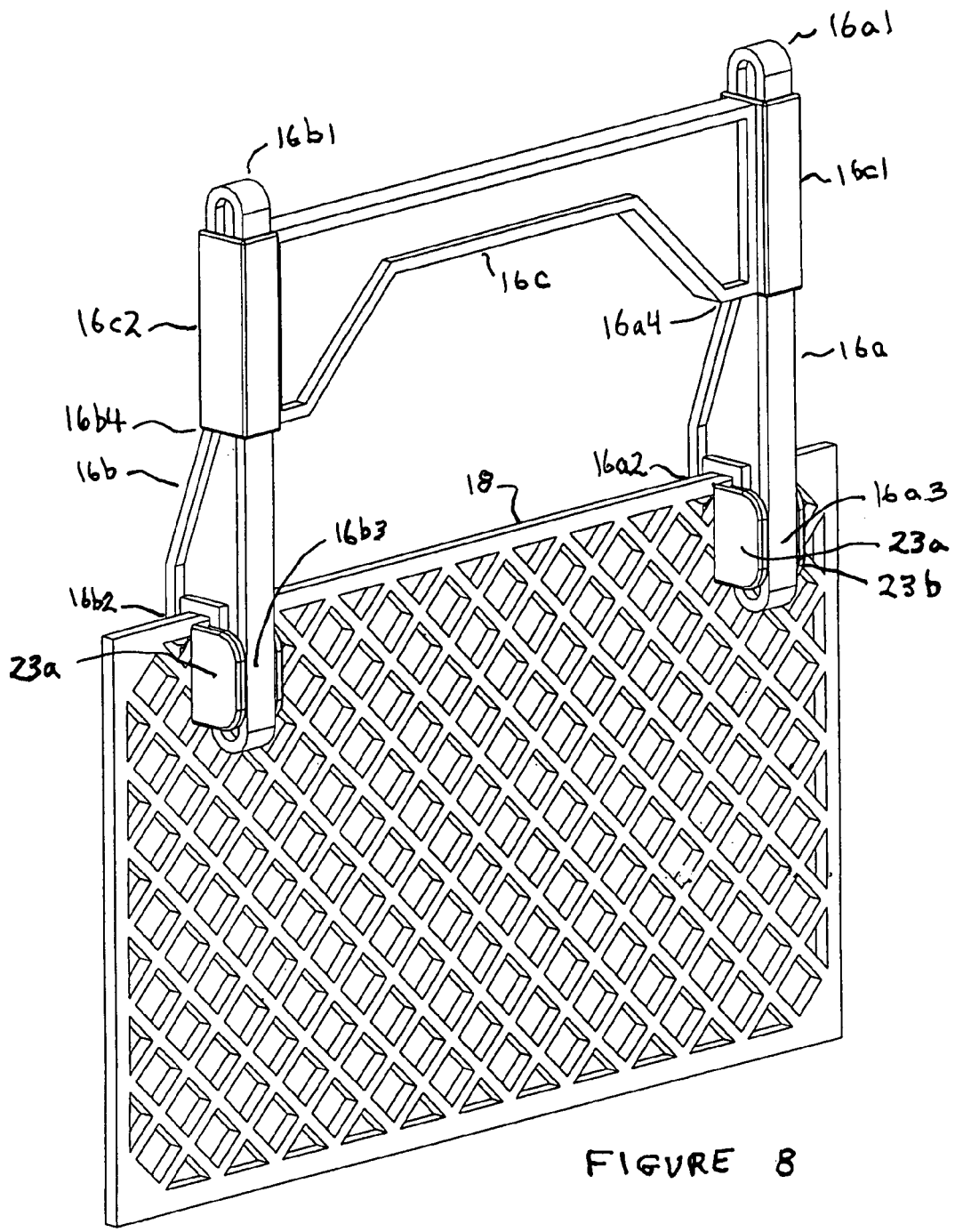
FIG. 8 show a rear view of the assembled vertical support member mounted on top of the front of a nesting type cart basket, and it is pivoted and locked in its upright position to provide a level surface for carrying a long load in a horizontal orientation on top of the cart basket while prevent the load from falling off the side of the basket.
Figure 9:
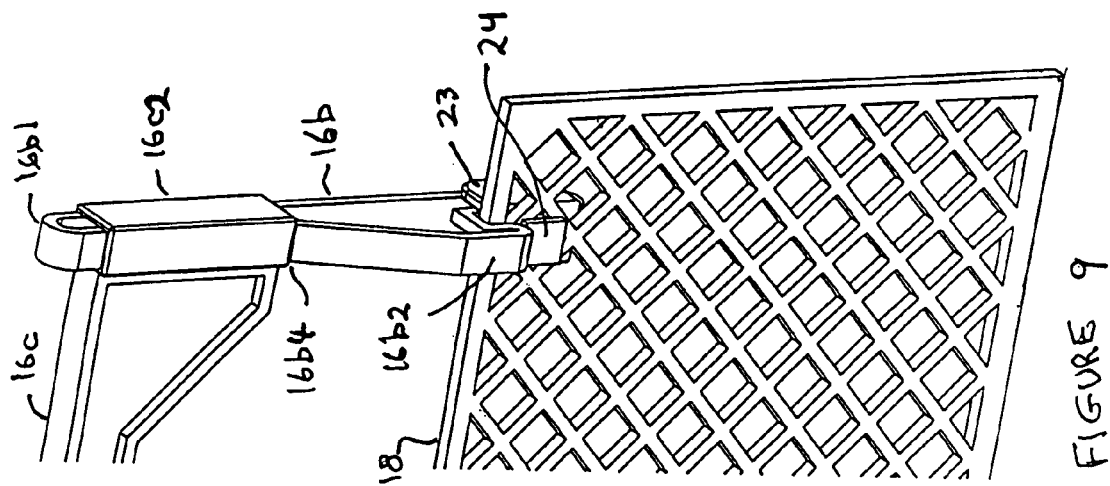
FIG. 9 shows a front view of a portion of the assembled vertical support member that is mounted on top of the front of a nesting type cart basket, and it is pivoted and locked in its upright position to provide a level surface for carrying a long load on top of the cart basket while prevent the load from falling off the side of the basket.

In FIG. 1 is shown a front view of a conventional nesting type cart 10 fitted with the novel load carrier and leveler comprising vertical members 15a and 15b, and front vertical support member 16 that comprises a horizontal crossbar piece 16c and two vertical pieces 16a and 16b. Vertical support member 16 is shown in its downward storage position for when no long loads are to be carried on top of cart basket 11. Elements 15a, 15b, 16a, 16b and 16c are not shown in detail in FIGS. 1 through 3 but are shown and described in detail with reference to FIGS. 5 through 11. Cart 10 typically comprises a frame 13 having four wheels 14 and a push handle 12, and a basket 11 that is attached to frame 13. Cart 10 shown in FIGS. 1 through 3 is of the nesting type for more compact storage of a number of carts and, accordingly, basket 11 is tapered as shown in FIG. 1 with its front wall 18 being smaller than its rear wall 19. The result is that the top of basket 11 is not level. As nesting carriages are well-known in the art details of how rear wall 19 swings forward and upward to provide an opening for nesting of carts 10 are not shown or described. In addition, the mesh work of the bottom and four side walls of basket 11 in FIGS. 1 through 4 are not shown to make it easier to understand the present invention. Further, carts 10 sometimes have baskets 11 made of a rigid, metal mesh, and sometimes they are made of a molded, tough plastic mesh such as shown in FIGS. 8 and 9.

The integral load carrier and leveler means for a nesting type cart 10 comprises basically three members. There are first and second vertical members 15a and 15b attached to either the top of basket 11 or to a portion of frame 13 to which push handle 12 is attached and are spaced as shown. There is a also a third vertical support member 16 that is pivotally attached to the top of front wall 18 of cart 10 and it comprises pieces 16a, 16b and 16c. When the novel load leveler is not required vertical support member 16 is unlatched and pivoted downward to rest against the inside surface of front wall 18 of basket 11 as shown in FIG. 1. When vertical support member 16 is pivoted into its downward storage position a plurality of carts 10 may be nested together for storage in a conventional, known matter.

More particularly, vertical support member 16 has two spaced, vertical pieces 16a and 16b, and a horizontal crossbar piece 16c assembled as shown. Pieces 16a and 16b each have a vertical extension 16a1 or 16b1 as shown. The two vertical extensions 16a and 16b1 cooperate with vertical members 15a and 15b to help prevent long loads from falling off the top of cart 10 to the side as shown in and described in greater detail with reference to FIG. 3 and other figures.

In FIG. 2 is shown a conventional type, nesting cart 10 fitted with the novel load carrier and leveler means and having its vertical support member 16 in its upright position for use in supporting long loads to be carried safely on top of the cart basket 11. The basic parts of cart 10 have previously been described with reference to FIG. 1 and are not described again. The two spaced vertical members 15a and 15b are shown attached to a crossbar 13b of frame 13 to which push handle 12 is also attached, but may also be attached to the top of rear wall 19 of basket 11. Vertical support member 16 is shown pivoted upward and locked into its upright, vertical position. As described in the previous paragraph vertical support member 16 has two spaced, vertical pieces 16a and 16b, and a crossbar piece 16c between them.

With basket 11 being tapered the top edge of its front wall 18 is lower than the top edge of its rear wall 19. Any load (not shown in this figure) sitting on top of the basket 11, without the use of the vertical support member 16, is not level and can easily fall off cart 10. When vertical support member 16 is pivoted upward and locked into its upright, vertical position, as shown in FIG. 2, the top of its crossbar piece 16c lies in a horizontal plane including the top of rear wall 19 of basket 11. Any long load resting on top of crossbar 16c and the top of rear wall 19 lie in a horizontal plane and are less prone to full off cart 10. Details of the two spaced vertical members 15a and 15b are shown in and described with reference to FIG. 11. Briefly however, vertical extensions 16a1 and 16b1 extending above crossbar piece 16c cooperate with vertical members 15a and 15b at the top rear of basket 11 to constrain any long loads on top of basket 11, such as shown in FIG. 3, from falling off the side of cart 10. Vertical extensions 16a1 and 16b1 may extend from one to a several inches above crossbar piece 16c. Details of vertical support member 16 and how it is locked into its upright position are shown in and described with reference to FIGS. 5 through 10.

The vertical support member 16 shown in FIGS. 2 and 3 has its horizontal crossbar piece 16c sitting higher than the top of front wall 18 of basket 11 in order to be level with the top of rear wall 19 of basket 11. This is necessary because the front of basket 11 is tapered with respect to the rear of the basket so that the front of one cart 10 can nest inside the rear of another cart 10 in a manner well known in the art.

In FIG. 3 is shown a view of cart 10 with the novel load carrier and leveler in use to support long pieces of lumber 17 in a horizontal plane to keep them from falling off cart 10. In addition, vertical members 15*a* and 15*b*, and vertical extensions 16*a*1 and 16*b*1 of vertical pieces 16*a* and 16*b* provide a side constraint to pieces of lumber 17 to prevent them from falling off the side of cart 10. It should be understood that the height of the vertical extensions and vertical members depends on the number of long pieces 17 that can safely be held on top of cart 10.

Figure 4:
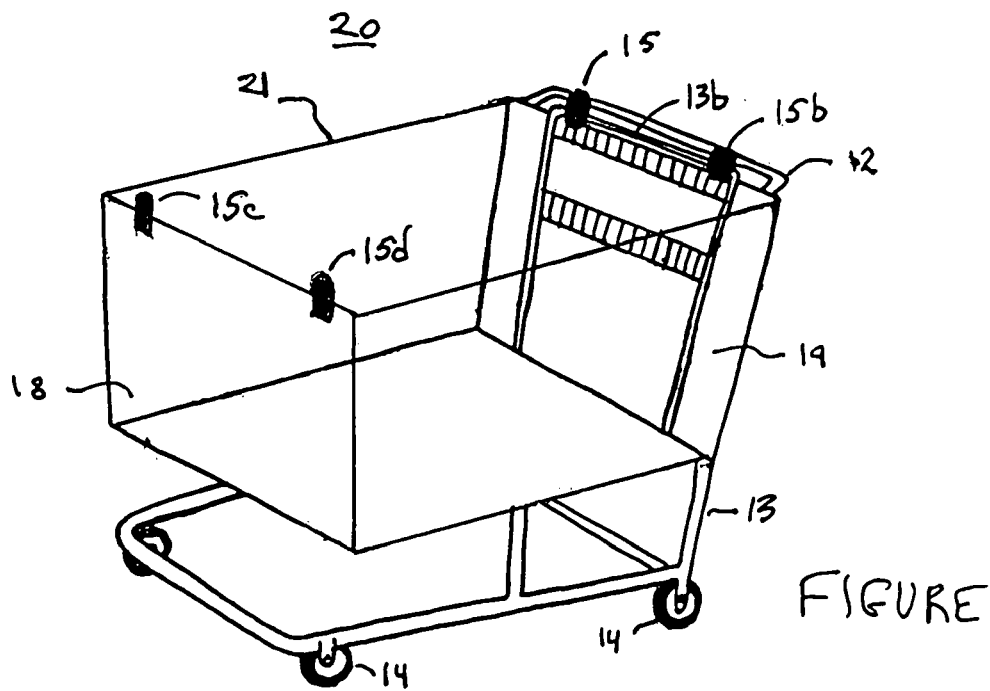
FIG. 4 shows a view of a conventional non-nesting type cart that has a level basket top and with vertical members mounted on top of the rear wall of a nesting type cart in front of the push handle, and also mounted on top of the front wall of the cart basket to prevent long loads carried on top of the cart from falling off the sides of the cart basket.

However, there are carts 20, the basket 21 of which has a level top, that are not intended to nest together and the front portion of their baskets are not tapered with respect to their rear portion. An example of such a cart 20 is shown in FIG. 4. Thus, there is no need for a vertical support member 16 as shown in FIGS. 1 through 3 since the top of the cart basket 21 is already level. However, an alternative embodiment of the invention is used with such carts 20 having baskets 21 the top of which is level. There is still a need for vertical members 15*a* and 15*b* to prevent long pieces (not shown in FIG. 4) on top of basket 21 from falling off the side of cart 20 as described in the previous paragraph. In this alternative embodiment vertical members 15*a* and 15*b* are utilized, but instead of vertical support member 16 two more vertical members 15*c* and 15*d* are mounted on the top of the front wall 18 of basket 21 as shown. Members 15*a* through 15*d* are all identical and are described and shown in greater detail with reference to FIG. 11. Thus, adequate horizontal support is provided to prevent a long load from sliding off the side of basket 21.

In FIG. 5 is shown a detailed view of one of vertical piece 16*a* or 16*b*, which are identical and are part of vertical support member 16, and only vertical piece 16*b* is shown in this Figure. Because vertical pieces 16*a* and 16*b* are identical the following description applies equally to both of them.

Vertical piece 16*b* has gap 20 which is used to lock it to side piece 16*c*2 of crossbar 16*c* when these parts are assembled together as shown on FIG. 8. The bottom of crossbar 16*c* also rests on shoulder 16*b*4 when it is fully inserted onto piece 16*b*. At the bottom of vertical piece 16*b* is formed a channel 26 that is better seen and described with reference to FIG. 10. This channel 26 facilitates locking vertical piece 16*b* (and 16*a*) to the top of front wall 18 as described in greater detail further in this detailed description.

At the bottom of vertical piece 16*b*, in the area marked 16*b*3, is a separate mounting piece 23 that is connected in a rotatable manner. Mounting piece 23 has a square portion 24 that is spaced from the main body of 23 by an extension 25. Mounting piece 23 is shown and described in more detail with reference to FIGS. 6 and 7. Briefly, mounting piece 23 is fastened to cart front wall 18 and vertical piece 16*b* rides along pivots around it when being raised to its upright and locked position as shown in FIGS. 8 and 9, and being un-locked and rotated to its storage position as shown in FIGS. 1 and 10.

Figure 6:
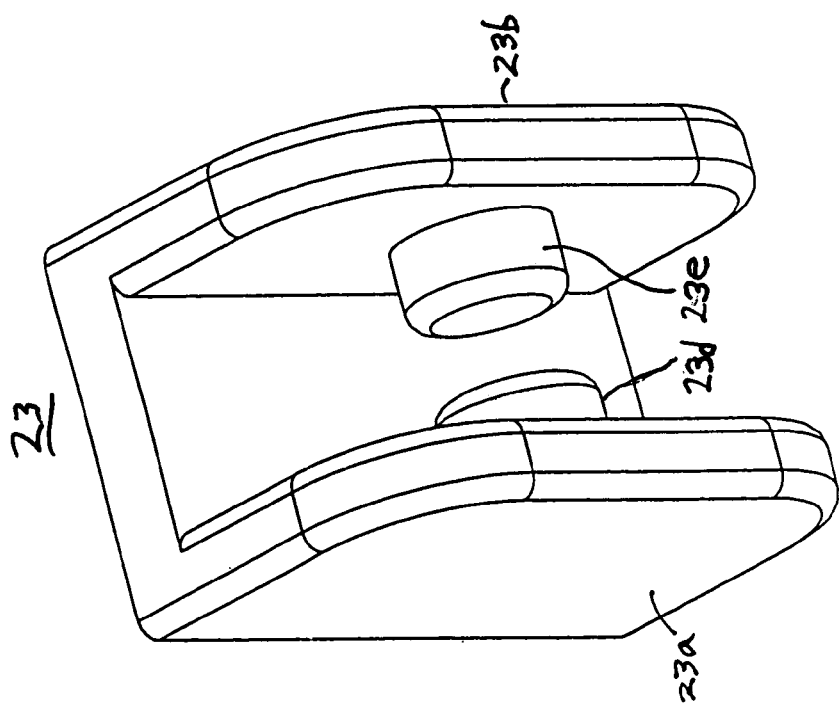
FIG. 6 shows a rear view of a mounting piece attached to the bottom of each vertical piece of the vertical support member.

FIG. 6 shows a rear view of a mounting piece 23 that is assembled to both vertical pieces 16*a* and 16*b* of vertical support member 16. Piece 23 has two parallel side walls 23*a* and 23*b* with a distance between them that permits it to sit astride the side of the main part of both vertical pieces 16*a* and 16*b*. Side wall 23*a* has a cylindrical protrusion 23*d* and side wall 23*b* has a cylindrical protrusion 23*e* as shown.

When a mounting piece 23 is attached to the bottom of one of vertical pieces 16*a* and 16*b* these protrusions 23*d* and 23*e* sit in and ride in channel 26 at the bottom of vertical pieces 16*a* and 16*b*. When so positioned mounting piece 23 can rotate with respect to the main body of pieces 16*a* or 16*b* and can ride along their channel 26. This is better seen in FIG. 10.

Figure 7:
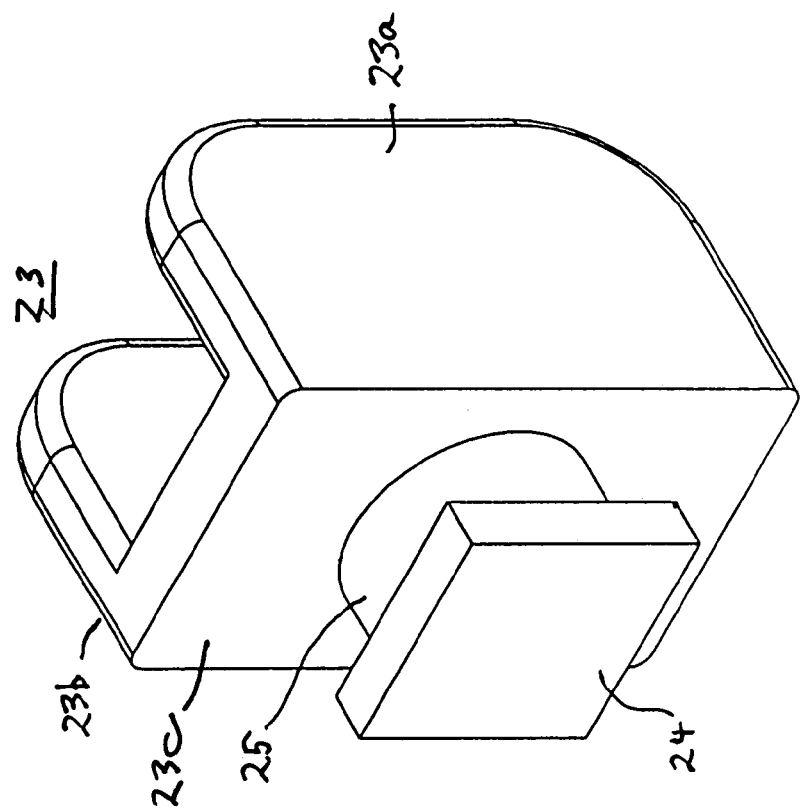
FIG. 7 shows a front view of the mounting piece of the vertical support member.

FIG. 7 shows a front view of a mounting piece 23 that is rotatably mounted to and is part of both vertical pieces 16*a* and 16*b* of vertical support member 16. Piece 23 has a square piece 24 that is spaced from its end wall 23*c* by a cylindrical extension 25. The length of extension 25 is the same as the thickness of the front wall 18 of basket 11. In the embodiment of the invention shown in these Figures cart basket 11 is molded of tough plastic that has a mesh web consisting of square holes as shown in FIGS. 8 and 9. How a mounting piece 23 attaches to the front wall 18 of a cart 10 is better shown and described with reference to FIG. 9.

In FIG. 8 is shown a rear view of an assembled vertical support member 16 that is attached to front wall 18 of basket 11, and it is shown pivoted upright and locked in its upright position to provide a level surface on top of its crossbar piece 16*c* to carry a long load on top of cart basket 11. In assembly to front wall 18, vertical pieces 16*a* and 16*b* are first individually mounted to wall 18 as is described in greater detail with reference to FIG. 9. When they are mounted vertical pieces 16*a* and 16*b* are in their upright position as shown. Crossbar piece 16*c* is then placed over and moved downward onto vertical pieces 16*a* and 16*b* until it contacts shoulders 16*a*4 and 16*b*4. In this position gap 20 shown in FIG. 5 locks into position inside crossbar piece 16*c*.

As previously described, vertical piece 16*b* has a hook 16*b*2 and vertical piece 16*a* has hook 16*a*2 formed as part thereof that each define a space 22 as seen in FIG. 5. These hooks 16*a*2 and 16*b*2 sit astride the top of front wall 18 of basket 11 as shown in FIGS. 8 and 9 when vertical support member 16 is rotated into its upright position and the pieces 16*a* and 16*b* are then pushed downward to thereby lock vertical support member 16 into its upright position on top of front wall 18 as shown in FIGS. 8 and 9. The width of the spaces 22 is only slightly larger than the combined thickness of front wall 18 of basket 11 and wall 23*c* of mounting member 23 so vertical pieces 16*a* and 16*b* of vertical support member 16 can sit astride the top of wall 18.

To move vertical support member 16 from its upright, locked position as shown in FIGS. 2, 3, 8 and 9, to its storage position as shown in FIG. 1, vertical support member 16 is first pushed upward until its hooks 16*a*2 and 16*b*2 are above the top of front wall 18. This can happen because protrusions 23*d* and 23*e* of mounting member 23 can move vertically along channel 26 formed in the bottom portion of vertical pieces 16*a* and 16*b*. Once the hooks 16*a*2 and 16*b*2 are above the top of front wall 18 vertical support member 16 can be rotated around protrusions 23*d* and 23*e* into its downward storage position as shown in FIG. 1. This is better shown and described with reference to FIG. 10.

In FIG. 9 is show a partial front view of the assembled vertical support member 16 that is mounted on top of the front wall 18 of a nesting type cart basket 11, and it is pivoted and locked in its upright position to provide a level surface on top of cross bar piece 16*c* to carry a long load on top of the cart basket. In FIG. 9 it can be seen that hook 16*b*2 sits over the top of front wall 18 and the square portion 24 of mounting piece 23 protrudes through a hole in the mesh of front wall 18 of basket 11. This occurs, as previously described, because the length of extension 25 is the same as the thickness of the front wall 18 of basket 11. In addition, the length of each side of square portion 24 is only slightly smaller than the dimension of the square holes through wall 18. Thus, square portion 24 can pass through the square holes through front wall 18.

When mounting a vertical piece 16a or 16b to the front wall 18 of a cart 10 it is first rotated forty-five degrees from the vertical so that the square portion 24 of its mounting member 23 can align with and pass through a hole through front wall 18 just below the top of front wall 18 as shown. The vertical pieces 16a and 16b are then rotated back to the vertical so the square pieces 24 are not aligned with the square holes through wall 18 and they are thereby locked to front wall 18 as shown in FIG. 9. Due to tight manufacturing tolerances pieces 16a and 16b are locked snugly to front wall 18. Cross bar 16c is then inserted down over the top of each of vertical pieces 16a and 16b until it rests on their shoulders 16a4 and 16b4 and is locked by gap 30 shown in FIG. 5. This may also be a force fit.

While basket 11 is described and shown as being molded of tough plastic, it may also be fabricated from metal rod in a mesh construction in a manner well known in the art. Although not shown in the Figures, if a basket is made of a wire mesh square portions 24 are inappropriate and instead vertical pieces 16a and 16b are fastened to the basket wall using nuts, bolts and metal washers in a clamping action. From the inside of basket 11 two bolts would be passed through a part of mounting piece 23 of each of vertical pieces 16a and 16b and the metal mesh of the front basket wall 18. The bolts would then extend through large washers or a plate and a lock nut would then be tightly screwed onto each of the two bolts to securely hold vertical support member 16 to front wall 18 of basket 11.

In FIG. 10 is shown a side view of vertical piece 16b of vertical support member 16 released from its locked upright position and being rotated to its downward, storage position. In this side view, wall 18 of basket 11 is shown at roughly a forty-five degree angle from the vertical only to save space in the drawing. The following description applies equally to vertical piece 16a so is not repeated for the sake of brevity.

As previously described, when vertical support member 16 is in its upright and locked position its hooks 16a2 and 16b2 of the respective vertical pieces 16a and 16b sit astride the top of wall 18 as shown in FIGS. 8 and 9. In this position the protrusions 23d and 23e of the mounting member 23 sit in channel 26 of vertical piece 16b at a point spaced above the bottom of the channel 26 as shown in FIG. 5. This space permits vertical piece 16b of vertical support member 16 to move upward to release hook 16b2 when it is desired to move vertical support member 16 to its storage position as shown in FIG. 1. After vertical support member 16 is moved upward as far as it can go, protrusion 23d and 23e sit in the bottom of channel 26 of vertical piece 16b as shown in FIG. 10. In this position hook 16b2 is above the top of front wall 18 so it can swing clockwise as indicated by the arrow. It is swung beyond what is shown in the figure until it rests against the inner side of wall 18 which is to the lower right. This same description also applies to vertical piece 16a.

Figure 11:
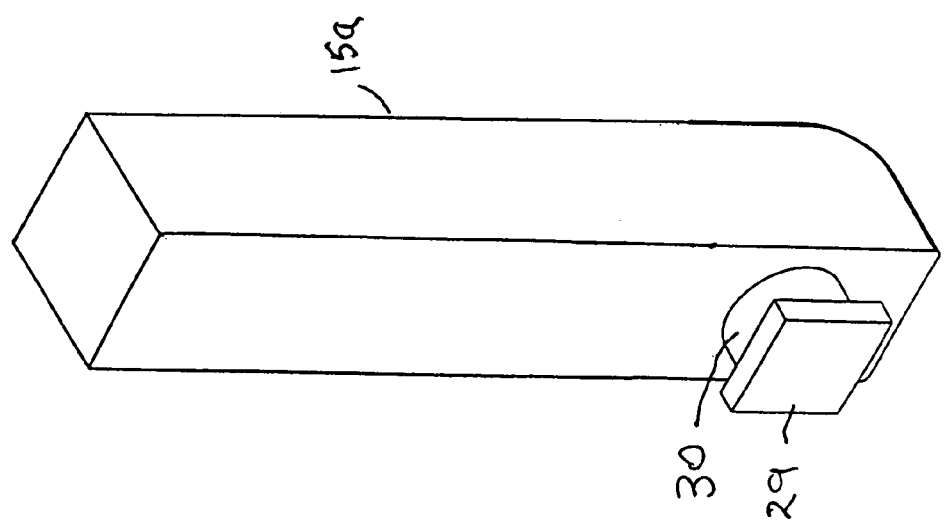
FIG. 11 shows one of the two identical vertical members that are mounted on the top rear of a cart basket to provide lateral support against long pieces on top of a cart basket from falling off the side of the basket.

In FIG. 11 is shown a view of vertical member 15a that is mounted at the top rear of cart 10 to provide lateral support against long pieces on top of a basket 11 from falling off the side of the basket 11. Vertical member 15b is identical to piece 15a. Using the square portion 29 with its extension 30 vertical member 15a is attached through square holes in the rear wall 19 of basket 11 in the same manner that vertical pieces 16a and 16b are attached to the front wall 18 of basket 11 and described above. Member 15a is rotated forty-five degrees from the vertical so that its square portion 29 can pass through a square hole just below the top of rear wall 19. Member 15a is then rotated back to the vertical so that it is locked to rear wall 19 in the same manner that vertical pieces 16a and 16b lock to front wall 18. Due to tight manufacturing tolerances piece 15a is locked snugly to rear wall 19.

However, vertical members 15a and 15b may be fastened to the rear wall 19 of basket 11 using nuts, bolts and metal pieces in a clamping action that is not shown but is described for vertical pieces 16a and 16b. Vertical members 15a and 15b may alternatively be attached to the portion of the frame of cart 10 to which handle 12 is attached.

The novel load carrier and leveler may be manufactured as part of a new cart 10, in which case members 15a and 15b and 16 are preferably permanently attached to the appropriate parts of the cart 10. Alternatively, the load leveler may be retrofit to a cart 10. It is the retrofit version that is shown and described herein since the attachment to a cart 10 is more complex.

While want has been described herein is the preferred embodiment of the invention, it should be understood by those skilled in the art that numerous changes may be made without departing from the spirit and scope of the invention.

What is claimed is:

1. A load carrier for a wheeled cart (10) that has a handle (12) on the top rear of the cart for pushing the cart, has a basket (11) on the cart with a front wall (18) furthest from the handle, the front wall of the basket having a thickness and consisting of a mesh of adjacent, identical square holes arranged in parallel rows, the load carrier assisting in carrying loads that are too long to fit in the basket, the load carrier comprising:

a first and a second member (15a, 15b) that are identical, are spaced from each other and are each fastened to the top of the cart nearest the handle, the first and a second members projecting upward and extending above the handle;

a third and a fourth member (16a, 16b) that are identical and are each fastened to the front wall of the cart;

wherein the third and fourth members are each elongated, each has a body (23) that is pivotally connected to the third and fourth members, each has an extension (25) having a first and a second end and the first end is connected to the body, the extension has a length equal to the thickness of the front wall of the basket and the extension is passable through the square holes through the front wall of the basket, and a square shaped head (24) is attached to the second end of the extension spaced from the body with the square shaped head having square side dimensions only slightly smaller than the size of the square holes through the front wall of the basket, wherein to fasten the third and fourth members to the front wall of the basket they are each positioned at an angle other than vertical so their square shaped head is aligned with and can pass through a square hole through the front wall of the basket, and the third and fourth members are then rotated to be vertical which locks them to the front wall of the basket, and the third and fourth members are spaced from each other, and a fifth member (16c) that is fastened to the third and the fourth members after they are attached to the front wall of the basket and are vertically oriented to provide a generally horizontal surface that extends above the top of the front wall of the basket, and when a load that is too long to fit in the basket is placed on top of the cart it sits generally level on top of the fifth member and the handle of the cart.

2. The load carrier in accordance with claim 1 wherein the third, fourth and fifth members fastened together and attached to the front wall of the basket are pivotally mounted to the front wall and pivot between an upward position where they extend above the top of the front wall of the cart and a downward position where they rest against the front wall of the cart and do not extend above the top of the front wall of the cart.

3. The load carrier in accordance with claim 2 further comprising means (16*b*2) to lock the third, fourth and fifth members that are fastened together and attached to the front wall of the basket in their upward extending position until it is desired to pivot them to their downward position.

4. The load carrier in accordance with claim 3 wherein when the fifth member is fastened to the third and the fourth members a portion of the third and the fourth members extend above the fifth member and these extending portions cooperate with the first and second members to help prevent a long load sitting on top of the fifth member and the top of the handle of the cart from sliding off the side of the cart.

\* \* \* \* \*